Figure 1:
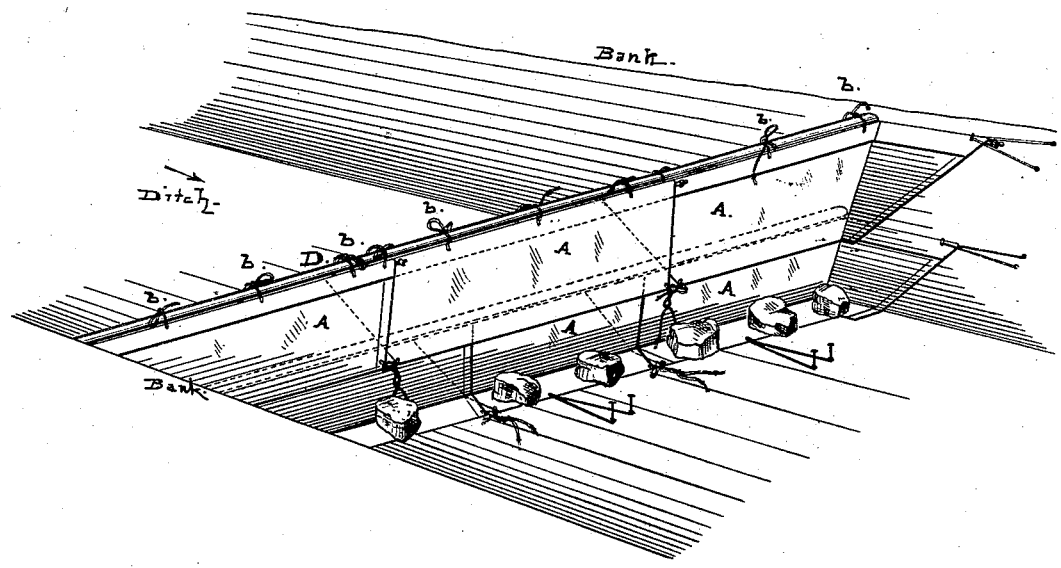

(No Model.)

J. D. OUSTERHOUT.
Movable Dam.

No. 236,248.          Patented Jan. 4, 1881.

Witnesses:

Inventor:
Jeremiah D. Ousterhout
by his Attys,

UNITED STATES PATENT OFFICE.

JEREMIAH D. OUSTERHOUT, OF SAN BERNARDINO, CALIFORNIA.

MOVABLE DAM.

SPECIFICATION forming part of Letters Patent No. 236,248, dated January 4, 1881.

Application filed October 5, 1880. (No model.)

*To all whom it may concern:*

Be it known that I, JEREMIAH D. OUSTER-HOUT, of San Bernardino, in the county of San Bernardino and State of California, have made and invented a certain new and useful Improvement in Movable Dams; and I do hereby declare that the following description and the accompanying drawings fully and exactly set forth and define the nature of my said invention and the manner in which I operate or apply the same.

The present invention has relation to that class of movable dams composed of canvas; and the object thereof is to provide a novel construction of such device whereby it can be readily built of any length and height required to control bodies of water in artificial channels or ditches for the purpose of irrigating.

The invention consists in a dam constructed or composed of canvas, with its several connections and attachments, as shown in the drawings, and hereinafter described.

Figure 2:
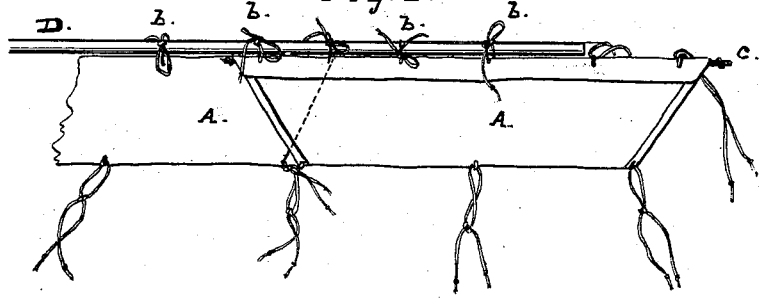
Figure 3:
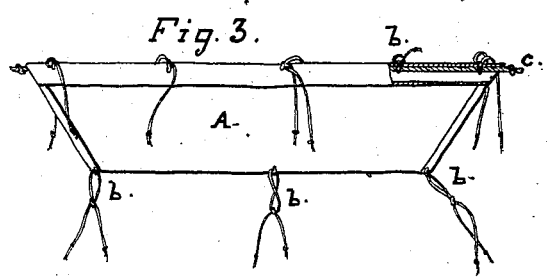

In the said drawings, Figure 1 is a perspective view of several sections joined together to form a dam. Fig. 2 is a view of one of the sections.

The flexible sections A A, of which I construct a dam, are made of canvas cut to the proper size and strengthened at and around the edges by binding or turning the material several times over upon itself. At suitable intervals along the edges of each section I fix cords $b\ b$, as a means for securing one section to another, and also for fastening the sections to the poles, anchors, and pegs employed to stretch and hold the dam in position. I also run a bolt-rope, $c$, along the edge, and more particularly at the longer edge, to stiffen the canvas and prevent the cords $b$ from tearing out. These sections I place in position to form a dam after the following manner: At and across the bottom part of the ditch or other channel, and at a height above the bottom less than the width of the canvas sections, I place and fix a pole or timber, D, in a horizontal position. To this pole I secure, by means of the cords $b$, as many sections as may be required to extend from side to side of the ditch. A portion of the canvas at the lower edge of the sections will then lie upon the bottom, and it is held down thereon by using stones or weights of any kind, or by throwing a quantity of earth upon it. This height is then increased in the same manner by placing in position a second row of sections above the first, and allowing the contiguous edges of the layers to overlap, so that any required depth or body of water can be obtained at the point where the dam is placed.

This mode of forming a dam is simple, cheap, and expeditious. One man can easily handle and place the sections, and in transporting or storing the sections they are easily packed in small compass and carried from place to place. I have shown these sections as cut of a trapezoidal shape, or with the upper edge somewhat longer than the lower edge, so that the ends of any two sections, when brought together, will overlap and lie diagonally over each other, and thereby make a close joint.

Having thus fully described my invention, what I claim, and desire to secure by Letters Patent, is—

A detachable dam-section, A, formed of textile material and of trapezoidal shape, with the strengthened or re-enforced edges $c\ c$, and having the tie-cords $b\ b$, substantially as described, for the purposes set forth.

Witness my hand and seal.

JEREMIAH DRAKE OUSTERHOUT. [L. S.]

Attest:
 JOHN T. KNOX,
 WM. F. CLARK.